Oct. 11, 1949.  W. C. BUTTNER ET AL  2,484,779
CARBONATED WATER DISPENSER
Filed Aug. 9, 1946  2 Sheets-Sheet 1
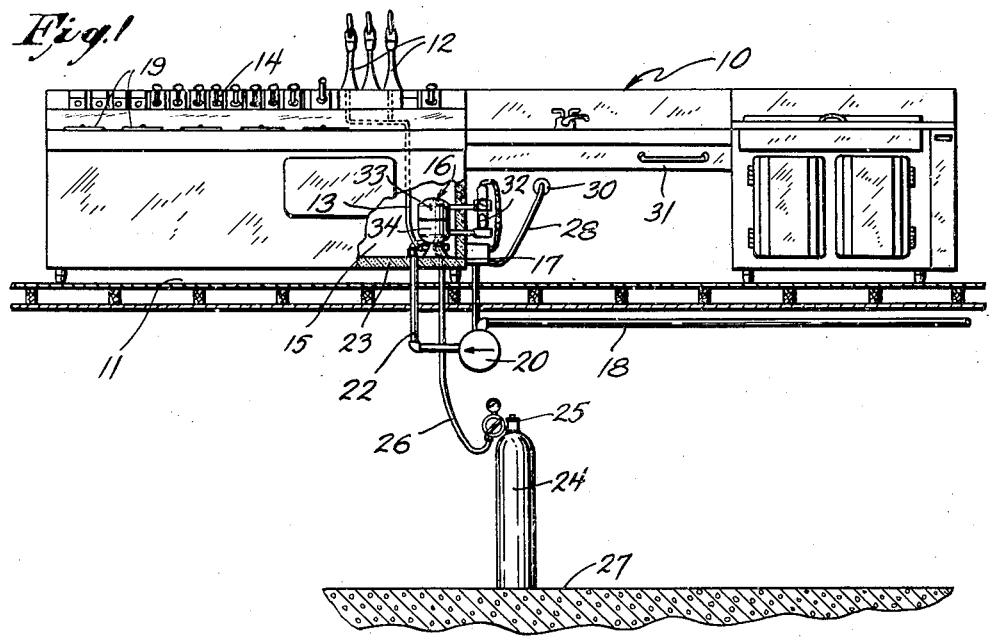
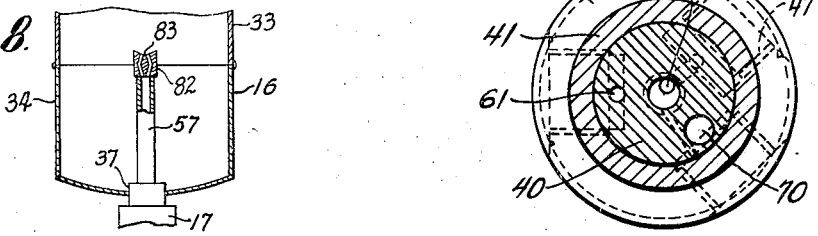
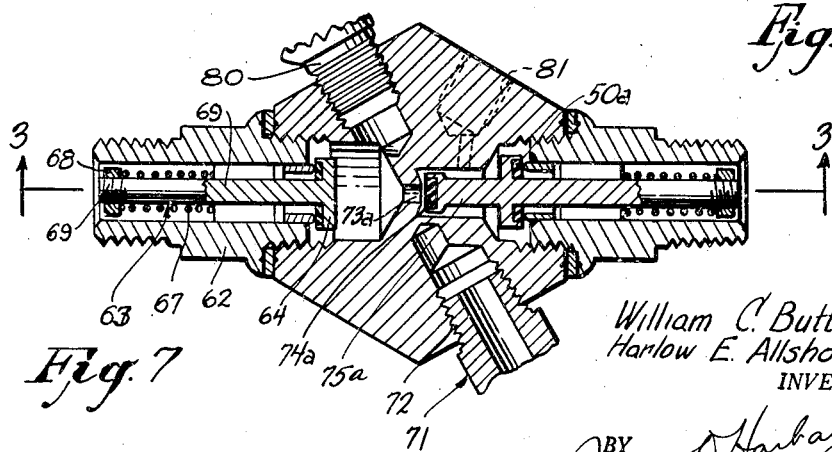
William C. Buttner
Harlow E. Allshouse
INVENTORS
BY
Atty.

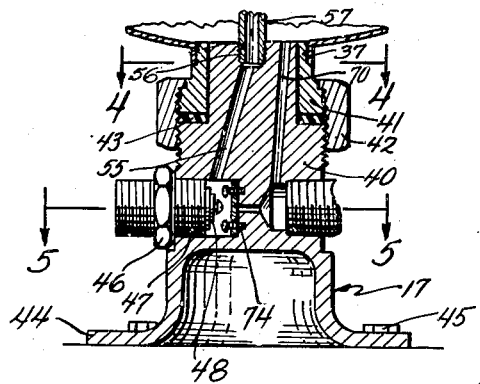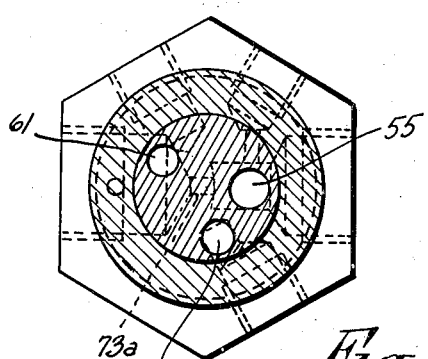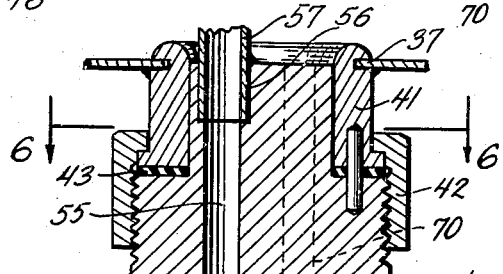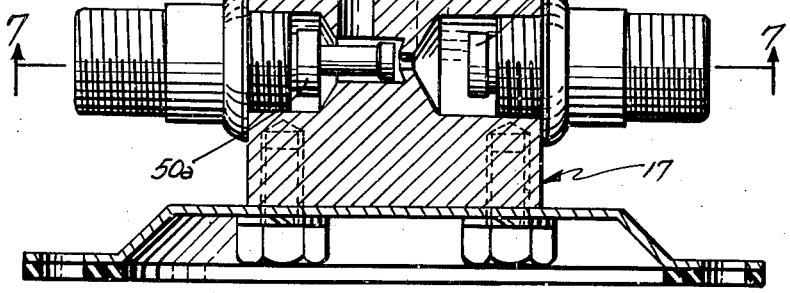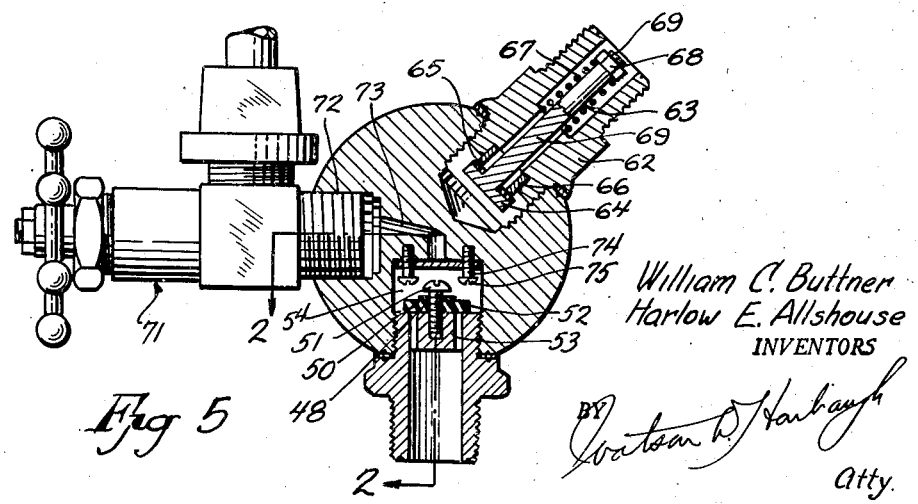

Patented Oct. 11, 1949

2,484,779

UNITED STATES PATENT OFFICE 2,484,779

CARBONATED WATER DISPENSER

William C. Buttner, Winnetka, and Harlow E. Allshouse, Chicago, Ill., assignors to The Bastian-Blessing Company, Chicago, Ill., a corporation of Illinois Application August 9, 1946, Serial No. 689,332

10 Claims. (Cl. 261—11)

1

The present invention is a continuation-in-part of our application Serial No. 518,528, which issued as Patent No. 2,450,825, relating to refrigeration cabinets and more particularly to the carbonation of water under conditions conducive to the absorption of $CO_2$ without condensation of moisture in a liquid level control that might short cycle the operation of the water supply pump.

In carbonating water, it has been the usual practice to agitate water by a paddle in an atmosphere of high pressure $CO_2$ to accomplish a commingling which would accelerate absorption of the $CO_2$ into the water.

To drive the paddle involves many moving parts, and, aside from expensive packings on the paddle shaft, the device generates heat and entails too large a device for it to be placed in expensively maintained refrigerating space.

Moreover, in order to utilize a single prime mover for pumping the water against the $CO_2$ pressure head and for driving the paddle, the prime mover is generally mounted proximate to the container where, if the carbonator were to be refrigerated, the motor would be subjected to deleterious conditions such as condensation and possible frost incrustation.

In the invention contemplated by our earlier application a new and improved arrangement is provided in which the carbonator is small, quite simple, and very rugged in construction with no moving parts involved, but which in combination with a refrigerated compartment utilizes the chill thereof to accelerate the absorption and increase the content of $CO_2$ in the water as well as affording a substantial reserve supply of cooled carbonated water as a standby for the rush hour mixing of refreshments.

Furthermore, the invention includes an improved arrangement of parts by which short cyclings of operation are eliminated which heretofore occurred when condensation bridged the electrodes controlling the cycle of operation of the pump motor.

A further object of the invention and one particularly related to this application resides in the prevention of $CO_2$ being blown back into the fresh water supply main if pump check valves happen to leak or be stuck in open position.

These being among the objects of the present invention, other and further objects will appear from the drawings, the description relating thereto and the appended claims:

Fig. 1 is a side elevation of two floors of a soda fountain establishment, partially in section,

2 showing how the invention is utilized with a soda fountain having an ice cream cooling cabinet.

Fig. 2 is an enlarged vertical section of the lower part of the carbonator shown in Fig. 1 illustrating one form of the invention.

Fig. 3 is a section similar to Fig. 2 showing a preferred form of the invention.

Fig. 4 is a section taken upon the line 4—4 in Fig. 2.

Fig. 5 is a section taken upon the line 5—5 in Fig. 2 with the section shown in Fig. 2 relating to same taken upon the angled line of 2—2 in Fig. 5.

Fig. 6 is a section taken upon line 6—6 in Fig. 3, and Fig. 7 is a horizontal section taken upon line 7—7 in Fig. 3.

Fig. 8 is a vertical section of a portion of the carbonator showing the disposition of the riser pipe and spray nozzle.

Referring more particularly to the drawings, an ice cream cabinet 10 is shown in Fig. 1 where it rests upon the floor 11 and includes as a part thereof two carbonated water draft arms 12 supplied with carbonated water through a conduit 13. Jars for syrup used in mixing carbonated beverages are located at 14 in the jar rail below and in front of which are refrigerated compartments 15 for ice cream and other ingredients used in the beverages. The compartments 15 are accessible in part through doors 19. In these refrigerating compartments the temperatures are kept at different levels. In the ice cream storing compartments the temperature is below the freezing point of water, while in a cooling cabinet where other ingredients are stored the temperature is within a range of 33° to 40° F.

Disposed in one of the cooling compartments, indicated at 15, a container 16, preferably of stainless steel is mounted upon a pedestal 17 and supplied with fresh water from a water main 18 as pumped by an electric motor driven pump 20 through a pipe 22. The pipe 22 extends through the bottom wall 23 of the cabinet and is connected to the pedestal 17. Carbon dioxide ($CO_2$) is supplied to the container 16 from a tank 24 at a pressure reduced and controlled by a pressure regulator 25 whose outlet is connected to a conduit means 26 also connected preferably to the pedestal 17. The tank 24 is shown as disposed in the basement upon the cellar floor 27 where it is accessible without occupying much needed space upon the floor above.

The motor and pump 20 are powered through an extension cord 28 plugged into a conventional outlet receptacle 30 located under the drainboard and washtable 31 of the cabinet. The motor control itself comprises a gauge glass device 32 as more particularly disclosed in the Arndt Patent No. 2,303,716 and an application for Letters Patent filed November 11, 1940 by William C. Buttner, Serial No. 363,951, which issued as Patent No. 2,356,117, reference to which is hereby made.

The container 16 constitutes a combination carbonator and carbonated water storage chamber made preferably of two shells 33 and 34 marginally flanged and welded at their edges and apertured as at 37 to provide an opening for mounting and affording access to the interior of the container as will be described in further detail later.

At the lower end of the container 16 the opening 37, already mentioned, receives male and female members 40 and 41, respectively, held together by a union nut 42 with a sealing washer 43 disposed therebetween.

It is preferred that the male member 40 be made of sufficient length and provided with flanges 44 at the bottom so that it may serve as the pedestal identified by the numeral 17, which pedestal is bolted to the bottom of the cabinet 15 by means of bolts 45 if desired, although the bolts may be omitted if there is danger of condensation reaching the cabinet insulation through the bolt holes. Aside from the conduits which lead to the gauge glass 32 all communication with the interior of the container is had by passageways drilled through the male member 40. One of these passageways is the water inlet passageway 55 supplied from the conduit 22 secured to a nipple 46 that is threaded into the pedestal 17 as at 47. The nipple 46 (Fig. 5) is provided with a back flow check valve 48 at its inner end which comprises a washer 50 made of an elastomer and held in place by a screw 51 having a cylindrical shank portion 52 upon which the washer may slide to and from its seating position to close the passageways 53 drilled through the nipple 46.

Around the valve 48 the pedestal is cut away to provide an enlarged valve compartment 54 from which the passageway 55 leads upwardly to terminate in an enlarged threaded opening 56 at the upper end of the male member 40. A riser pipe 57 is received in the threaded opening 56 to extend upwardly at the center of the container 16 to receive a nozzle 82 thereon which is provided with spray passageways 83 to break up the water forced through them into a fine spray. The nozzle preferably directs the spray upwardly and against the walls of the container.

$CO_2$ is supplied to the container through another passageway 61 (Fig. 4) in the male member 40. This passageway leads upwardly and opens into the container at the upper end of the male member 40. The connection of the $CO_2$ line 26 to the pedestal 17 is had through a nipple 62 (Fig. 5) also provided with a back flow check valve 63 therein having a piston like head 64 which carries a resilient seat 65 against the rounded edge of a short piece of cylindrical tubing 66 brazed into the inner end of the nipple 62. The shank 69 of the valve 63 extends outwardly to receive a compression spring 67 that is held in place by a nut 68 threaded upon the shank 69. With this arrangement for the $CO_2$ supply, water will not be forced back into the line 26 in event the pressure in the container is higher than the pressure of the $CO_2$ or when one tank 24 is being disconnected to be replaced by a full tank of $CO_2$. Furthermore, the passageway 61 with its opening on the upper end of the male member 40 will release the $CO_2$ in the container 16 where it will bubble up through the water with a commingling beneficial to absorption to carbonate the water.

The carbonated water is withdrawn from the container through a passageway 70 (Fig. 2) drilled in the male member 40 and terminating at the upper end thereof, which point of termination is preferably the lowest point in the container. The carbonated water is taken to the draft arms 12 through the conduit 13 as controlled by a hand shutoff valve 71 threaded into the pedestal as at 72.

The carbonated water passageway 70 and the fresh water passageway 55 are in communication with each other through a passageway 73 which interconnects the valve compartment 54 and the opening into which the valve 71 is threaded. A flapper check valve 74 is located in the valve compartment 54 where it is held in place by screws 75 having cylindrical shanks so that the flapper check will operate easily and prevent the fresh water from going directly to the carbonated line when the pump 20 is in operation, but will permit the carbonated water to move from the container back into the fresh water line past the flapper check valve 74 in event a leak exists which permits a back flow of the water into the fresh water line 22.

As more particularly shown in the above mentioned copending application Buttner Serial No. 363,951, Patent No. 2,356,117 reference to which is made, the gauge glass 32 comprises the hydroelectrode control having two electrodes, one of which is contacted by the liquid at the maximum level of the water in the container 16 and the other one breaks with the liquid at the lowest expected level of the water in the container 16. The upper electrode is connected directly to an electrical control, such as that shown in the Warrick Patent No. 2,110,313, reference to which is hereby made, and the lower electrode is connected to a switch which short circuits the electrodes when the electrical control is in open position as far as the motor operation is concerned. The liquid in the glass is grounded through an upwardly extending electrode.

In operation, when the electrical extension 28 is plugged into the outlet 30 the electrical control is in closed position to operate the motor and pump 20. If the level of the water in the container is below and out of contact with one of the electrodes the pump will immediately begin to withdraw water from the main 18 and force it into the container 16 through the riser pipe 57 and spray head 82.

With the $CO_2$ supplied to the container through the line 26 as regulated by the pressure regulator 25, the water sprayed from the spray head comes into contact with $CO_2$ to absorb a large quantity thereof. After the level of the water has approached the level of the spray ports the water closes contact between both electrodes to actuate the control and stop the pump.

After the carbonator has once been placed in operation the carbonated water present in the container 16 is chilled down to the temperature of the compartment 15 which preferably is within the temperature range of from 33° to 40° F. Thereafter, when carbonated water is withdrawn from the container 16 the level of the water falls until it breaks contact with one of the electrodes and the pump 20 repeats the cycle of filling the container 16 to its maximum level. The replenishing water may be precooled in a separate cooler. On flowing through the pedestal 17 and riser pipe 57 the water will be chilled by the coldness of the surrounding parts and the carbonated water surrounding the riser pipe 57 to a low temperature which is beneficial to the rapid absorption of the cold $CO_2$ gas present in the top of the container 16.

Furthermore, as the water level falls the $CO_2$ above it expands thereby reducing its pressure and permitting more $CO_2$ to enter the container to maintain the pressure determined by the regulator 25. Then, when the replenishing begins the liquid level rises which under other conditions would compress and increase the pressure of $CO_2$. The $CO_2$ is rapidly absorbed and more required, whereby the pressure in the container can be maintained uniform at all times by adjustment of the regulator 25, and the adjustment is sufficiently low to avoid an over carbonation at any time which is undesirable with root beer syrups.

Whenever the pump 20 is shut down, if there is any tendency to leak back through the water line 22, the leak is so controlled as to involve only carbonated water and not $CO_2$ gas. In understanding this, it will be noted that if the passageway 73 interconnecting the water line and the carbonated water line is absent, the pressure of the $CO_2$ at the spray nozzles 83 in the head 82 will be effective to force the water present in the riser pipe 57 down and back into the water line 22 with the gas escaping through the pump and into the water main 18 to cause such undesirable results as carbonated water coming from some other faucet supplied by the water main 18. This danger is eliminated by the invention. The passageway 73 maintains a level of the water in the riser pipe 57 constant with that of the carbonated water in the container 16, or, approached another way, the entire body of liquid present in the container 16 must be forced out and into the water main through the passage 73 before discharge of $CO_2$ in its gaseous form will take place into the water main 18. However, before this occurs the lowering level of the carbonated water in the container 16 outside of the riser pipe 57 as well as inside the riser pipe will break contact with one of the electrodes and start the pump up again. Therefore, without any danger of $CO_2$ entering the water main 18 the pump recycles itself if there is any leak back through it, with the opportunity that during the recycling operation any valves that might stick will free themselves and close. The quantity of carbonated water involved in this instance is comparatively small and little, if any, $CO_2$ gas will be lost even though it may be prone to bubble while in the conduit 22. Suitable safety relief valves and gauges may be provided as desired.

In the preferred embodiment of the invention shown in Figs. 3, 6 and 7 in which like numbers refer to similar parts, the check valves 50a and 74a are integrally connected by a shank portion 75a so that the check valve 74a is normally open while the check valve 50a is closed, and the check valve 74a is closed while the check valve 50a is forced open by water being pumped into the container 16.

In this embodiment it has been found to be possible to provide the bleeder passage 73a where it interconnects the $CO_2$ supply passage 61 and the fresh water inlet 54 because carbonated water will stand in the passage 61 the same as it does in the carbonated water passage 70 as far as slow leaks are concerned in the pump line. Both passages 70 and 61 open into the container 16 at the bottom thereof to drain water through the bleed passage 73a if a check valve in the pump line develops a leak.

A safety pressure relief valve 80 opens into the $CO_2$ supply line and a gauge (not shown) can be mounted in a threaded passage 81 provided for that purpose leading to the carbonated water discharge line.

Having thus described the invention, it will be readily apparent to those skilled in the art that the device can be easily installed initially and various modifications can be made depending upon the size and shape of the cabinet and upon the requirements for making installations in cabinets of different sizes, without departing from the spirit of the invention, the scope of which is commensurate with the appended claims.

What is claimed is:

1. A carbonator including a container, conduit means for injecting water into the container including a spray head whose outlet is above the maximum expected level, conduit means communicating with the container below the minimum expected level of carbonated water therein and normally open valve means interconnecting both of said conduit means and opening in the direction of flow of water to the water injecting conduit means.

2. A carbonator including a container, conduit means for introducing $CO_2$ into the container under pressure below the minimum expected level of water in the container, conduit means for injecting water into the container including a spray head whose outlet is above the maximum expected level in the container, conduit means for withdrawing carbonated water from the container below the minimum expected level in the container, and valve means interconnecting said water injecting conduit means and one of the other conduit means disposed in open communication with the injecting conduit means and opening in the direction of flow of water from said one of the other conduit means to the water injecting conduit means.

3. A carbonator including a container, conduit means for introducing $CO_2$ into the container under pressure, conduit means for withdrawing carbonated water from the container, one of said conduit means being in communication with the container below the minimum expected level of carbonated water in the container, conduit means for injecting water into the container at a point above the maximum expected level of carbonated water in the container including a back flow check valve, and means interconnecting said one of said conduit means and the water injecting conduit means including a valve carried by said back flow check valve which opens when said back flow check valve moves in closing direction.

4. A carbonator including a container, conduit means for injecting water into the container including a riser pipe and a spray head upon the riser pipe, conduit means for withdrawing carbonated water from the bottom of the container, and check valve means interconnecting both of said conduit means and opening in the direction of flow of water from the withdrawing conduit means to the water injecting conduit means.

5. A carbonator including a container, conduit means for injecting water into the container including a spray head whose outlet is above the maximum expected level, conduit means for withdrawing carbonated water from the container below the minimum expected level, and check valve means interconnecting both of said conduit means and opening in the direction of flow of water from the withdrawing conduit means to the water injecting conduit means.

6. A carbonator including a container connected directly to a source of $CO_2$ under pressure, means for cooling the container from the outside thereof, a conduit means for injecting water into the container including a riser pipe and a spray head at the outlet of the riser pipe located inside the tank above the maximum level of the water in the container, conduit means for withdrawing water from the bottom of the container, and means interconnecting both of said conduit means controlling the flow of water from the withdrawing conduit means to the water injecting conduit means when the water level in the riser pipe falls below the level of the water in the container.

7. A carbonator including a container, a conduit means for introducing $CO_2$ into the container under pressure, conduit means for injecting water into the container including a spray head whose outlet is above the maximum expected level in the container, conduit means for withdrawing carbonated water from the container below the minimum expected level in the container, and check valve means interconnecting said water injecting conduit means and water withdrawal conduit means disposed in open communication with the injecting conduit means and opening in the direction of flow of water from the withdrawing conduit means to the water injecting conduit means.

8. A carbonator including a container, conduit means for introducing $CO_2$ into the container under pressure, conduit means for injecting water into the container including a spray head whose outlet is above the maximum expected level in the container, conduit means for withdrawing carbonated water from the container below the minimum expected level in the container, a passage interconnecting said water injecting conduit means and said water withdrawal conduit means, and check valve means including a member for closing the interconnecting passage, said check valve means opening in the direction of flow of water from the withdrawing conduit means to the water injecting conduit means, and said check valve means also including a second member for closing the injecting conduit means said second member opening in the direction of flow of injected water.

9. A carbonator including a container, conduit means for injecting water into the container including a riser pipe and a spray head upon the riser pipe, a passage connecting the bottom of the container and said conduit means, and check valve means for closing said passage, said check valve means opening in the direction of flow of water from the passage to the water injecting conduit means.

10. A carbonator including a container, conduit means for introducing $CO_2$ into the container under pressure, conduit means for injecting water into the container including a spray head whose outlet is above the maximum expected level in the container, a passage connecting the interior of the container below the minimum expected level to said conduit means at a point below said minimum level, and check valve means disposed in said passage and opening in the direction of flow of water from the container to the water injecting conduit means.

WILLIAM C. BUTTNER.
HARLOW E. ALLSHOUSE.

REFERENCES CITED

The following references are of record in the file of this patent:

UNITED STATES PATENTS

| Number | Name | Date |
|---|---|---|
| 1,611,321 | Schmidt | Dec. 21, 1926 |